United States Patent
Herr et al.

(10) Patent No.: US 11,444,790 B1
(45) Date of Patent: Sep. 13, 2022

(54) DYNAMIC EXCLUSION OF RDMA-BASED SHARED MEMORY COMMUNICATION BASED ON PERFORMANCE-RELATED DATA

(71) Applicant: INTERNATIONAL BUSINESS MACHINES CORPORATION, Armonk, NY (US)

(72) Inventors: David Anthony Herr, Cary, NC (US); Randall Todd Kunkel, Apex, NC (US); Jerry Stevens, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/371,463

(22) Filed: Jul. 9, 2021

(51) Int. Cl.
*H04L 12/06* (2006.01)
*H04L 101/663* (2022.01)

(52) U.S. Cl.
CPC ........ *H04L 12/06* (2013.01); *H04L 2101/663* (2022.05)

(58) Field of Classification Search
CPC .......................... H04L 12/06; H04L 2101/663
USPC ........................................................ 709/212
See application file for complete search history.

(56) References Cited

U.S. PATENT DOCUMENTS

| | | | |
|---|---|---|---|
| 9,146,775 B2 | 9/2015 | Branson et al. | |
| 9,547,747 B2 | 1/2017 | Fan et al. | |
| 10,725,963 B2 | 7/2020 | Suzue et al. | |
| 10,868,731 B2 * | 12/2020 | Levy-Abegnoli | H04L 41/0813 |
| 11,099,902 B1 * | 8/2021 | Matthews | G06F 9/5027 |
| 11,240,162 B1 * | 2/2022 | Zur | H04L 47/27 |
| 11,258,707 B1 * | 2/2022 | Pudiyapura | H04L 45/742 |

(Continued)

FOREIGN PATENT DOCUMENTS

| | | |
|---|---|---|
| CN | 111277616 A | 6/2020 |
| WO | WO 2020/155417 A1 | 8/2020 |

OTHER PUBLICATIONS

Fox et al., IBM's Shared Memory Communications Over RDMA (SMC-R) Protocol (RFC7609), IPCOM000242783D, original publication date: Aug. 1, 2015, https://ip.com/IPCOM/000242783, 144 pages (Year: 2015).

(Continued)

*Primary Examiner* — Melvin H Pollack
(74) *Attorney, Agent, or Firm* — Teddi Maranzano, Esq.; Kevin P. Radigan, Esq.; Heslin Rothenberg Farley & Mesiti P.C.

(57) ABSTRACT

Shared memory communication is facilitated between systems of a computing environment capable of communicating over a network using transmission control protocol/Internet protocol (TCP/IP). The network includes a network path between one system and another system of the computing environment, where the network path passes through one or more routers of the network. The facilitating includes obtaining performance-related data for shared memory communication of the one system with the other system across the network path using a remote direct memory access (RDMA) protocol. Based on the performance-related data, the facilitating includes dynamically determining whether to use the RDMA protocol for shared memory communication of the one system with the other system across the network path, rather than the TCP/IP protocol.

20 Claims, 15 Drawing Sheets

(56) References Cited

U.S. PATENT DOCUMENTS

| | | | |
|---|---|---|---|
| 11,301,152 B1* | 4/2022 | Sillifant | G06F 3/067 |
| 2017/0329635 A1 | 11/2017 | Rathke | |
| 2020/0272579 A1* | 8/2020 | Humphrey | G06F 9/4856 |
| 2020/0358721 A1* | 11/2020 | Rimmer | H04L 49/9068 |
| 2020/0379922 A1* | 12/2020 | Kumar | G06F 12/1441 |
| 2020/0396126 A1* | 12/2020 | L'Ecuyer | G06F 13/1668 |
| 2021/0119930 A1* | 4/2021 | Debbage | H04L 1/1642 |
| 2021/0226892 A1* | 7/2021 | Fu | G06F 9/45558 |
| 2021/0232530 A1* | 7/2021 | Olarig | G06F 13/387 |
| 2021/0243247 A1* | 8/2021 | He | H04L 67/10 |
| 2021/0263779 A1* | 8/2021 | Haghighat | G06F 9/5061 |
| 2021/0266253 A1* | 8/2021 | He | H04L 47/125 |
| 2021/0289027 A1* | 9/2021 | Smith | G06F 3/0679 |
| 2021/0303164 A1* | 9/2021 | Grunwald | G06F 3/0629 |
| 2021/0303477 A1* | 9/2021 | Doshi | G06F 12/1009 |
| 2021/0306268 A1* | 9/2021 | Nagaraj | H04L 45/24 |
| 2021/0314303 A1* | 10/2021 | Kittur | H04L 9/3263 |
| 2021/0373767 A1* | 12/2021 | Zhao | G06F 3/064 |
| 2021/0382663 A1* | 12/2021 | Lee | G06F 9/5083 |
| 2021/0405915 A1* | 12/2021 | Agarwal | G06F 3/067 |
| 2022/0100687 A1* | 3/2022 | Sahin | G06F 13/28 |
| 2022/0150164 A1* | 5/2022 | Berman | H04L 49/25 |

OTHER PUBLICATIONS

Fu et al., "DRS: Auto-Scaling for Real-Time Stream Analytics", IEEE/ACM Transactions on Networking, vol. 25, No. 6, Dec. 2017, pp. 3338-3352 (Year: 2017).

Huck et al., "An Autonomic Performance Environment for Exascale", Supercomputing Frontiers and Innovations, vol. 2, No. 3, 18 pages (Year: 2015).

IBM Publication, "z/Architecture Principles of Operation," IBM® Publication No. SA22-7832-12, 13th Edition, Sep. 2019 (pp. 1-2000).

Mel et al., "The NIST Definition of Cloud Computing," National Institute of Standards and Technology, Information Technology Laboratory, Special Publication 800-145, Sep. 2011 (pp. 1-7).

* cited by examiner

FACILITATE SHARED MEMORY COMMUNICATION BETWEEN SYSTEMS OF THE COMPUTING ENVIRONMENT CAPABLE OF COMMUNICATING OVER A NETWORK USING TRANSMISSION CONTROL PROTOCOL/INTERNET PROTOCOL (TCP/IP), WHERE A NETWORK PATH BETWEEN ONE SYSTEM AND ANOTHER SYSTEM OF THE COMPUTING ENVIRONMENT PASSES THROUGH ONE OR MORE ROUTERS OF THE NETWORK, INCLUDING: ~1000

OBTAINING PERFORMANCE-RELATED DATA FOR SHARED MEMORY COMMUNICATION OF THE ONE SYSTEM WITH THE OTHER SYSTEM ACROSS THE NETWORK PATH USING A REMOTE DIRECT MEMORY ACCESS (RDMA) PROTOCOL ~1002

BASED ON THE PERFORMANCE-RELATED DATA, DYNAMICALLY DETERMINING WHETHER TO USE THE RDMA PROTOCOL FOR SHARED MEMORY COMMUNICATION OF THE ONE SYSTEM WITH THE OTHER SYSTEM ACROSS THE NETWORK PATH, RATHER THAN THE TCP/IP PROTOCOL ~1004

BASED ON THE PERFORMANCE-RELATED DATA EXCEEDING ONE OR MORE SPECIFIED ACCEPTABLE THRESHOLDS, DETERMINING NOT TO USE THE RDMA PROTOCOL FOR SHARED MEMORY COMMUNICATION OF THE ONE SYSTEM WITH THE OTHER SYSTEM ACROSS THE NETWORK PATH, AND DYNAMICALLY ADDING IDENTIFICATION OF THE OTHER SYSTEM TO AN EXCLUDE DATA STRUCTURE, THE EXCLUDE DATA STRUCTURE IDENTIFYING ONE OR MORE SYSTEMS FOR WHICH RDMA PROTOCOL COMMUNICATION IS DYNAMICALLY EXCLUDED FROM USE BY THE ONE SYSTEM ~1006

USING THE TCP/IP PROTOCOL FOR THE SHARED MEMORY COMMUNICATION OF THE ONE SYSTEM WITH THE OTHER SYSTEM ACROSS THE NETWORK PATH ~1008

WHERE DYNAMICALLY ADDING INCLUDES DYNAMICALLY ADDING FOR A DEFINED TIME INTERVAL THE OTHER SYSTEM IDENTIFICATION TO THE EXCLUDE DATA STRUCTURE ~1010

DYNAMICALLY REDETERMINING, BASED ON EXPIRATION OF THE DEFINED TIME INTERVAL, WHETHER TO USE THE RDMA PROTOCOL FOR ONE OR MORE SHARED MEMORY COMMUNICATIONS OF THE ONE SYSTEM WITH THE OTHER SYSTEM ACROSS THE NETWORK PATH ~1012

WHERE THE DEFINED TIME INTERVAL IS USER-CONFIGURABLE ~1014

FIG. 10A

- WHERE THE ONE SYSTEM AND THE OTHER SYSTEM ARE IN DIFFERENT SUBNETS OF THE NETWORK, AND THE PERFORMANCE-RELATED DATA INCLUDES A COUNT OF ONE OR MORE ROUTERS ACROSS WHICH THE NETWORK PATH BETWEEN THE ONE SYSTEM AND THE OTHER SYSTEM PASSES ~1016

- WHERE THE OBTAINING AND THE DYNAMICALLY DETERMINING ARE BY THE ONE SYSTEM ~1018

USING THE RDMA PROTOCOL FOR SHARED MEMORY COMMUNICATION OF THE ONE SYSTEM WITH THE OTHER SYSTEM ACROSS THE NETWORK PATH ~1020

BASED ON THE USING, COLLECTING THE PERFORMANCE-RELATED DATA ~1022

- WHERE THE PERFORMANCE-RELATED DATA INCLUDES ONE OR MORE OF ROUND-TRIP TIME DATA FOR SHARED MEMORY COMMUNICATION BY THE ONE SYSTEM WITH THE OTHER SYSTEM ACROSS THE NETWORK PATH USING THE RDMA PROTOCOL, PACKET LOSS RATE DATA FOR THE SHARED MEMORY COMMUNICATION OF THE ONE SYSTEM WITH THE OTHER SYSTEM ACROSS THE NETWORK PATH USING THE RDMA PROTOCOL, OR DATA INDICATIVE OF NETWORK CONGESTION DURING THE SHARED MEMORY COMMUNICATION OF THE ONE SYSTEM WITH THE OTHER SYSTEM ACROSS THE NETWORK PATH USING THE RDMA PROTOCOL ~1024

- WHERE THE FACILITATING FURTHER INCLUDES ESTABLISHING A NEW CONNECTION BETWEEN THE ONE SYSTEM AND THE OTHER SYSTEM ACROSS THE NETWORK PATH, THE ESTABLISHING INCLUDING DETERMINING WHETHER THE OTHER SYSTEM IS LISTED IN AN EXCLUDE DATA STRUCTURE IDENTIFYING ONE OR MORE SYSTEMS OF THE COMPUTING ENVIRONMENT FOR WHICH RDMA PROTOCOL COMMUNICATION IS, AT LEAST TEMPORARILY, EXCLUDED FROM USE BY THE ONE SYSTEM, MEANING THAT THE TCP/IP PROTOCOL IS TO BE USED, AT LEAST TEMPORARILY, FOR SHARED MEMORY COMMUNICATION BETWEEN THE ONE SYSTEM AND THE OTHER SYSTEM ACROSS THE NEW CONNECTION ~1026

FIG. 10B

DYNAMIC EXCLUSION OF RDMA-BASED SHARED MEMORY COMMUNICATION BASED ON PERFORMANCE-RELATED DATA

BACKGROUND

One or more aspects relate, in general, to facilitating processing within a computing environment, and in particular, to enhancing shared memory communication performance between systems of a computing environment.

There are various types of computing environments, ranging from simple environments to more complex environments. A complex environment can include a plurality of host systems with a plurality of processors or a plurality of isolated memory spaces executing various types of systems. In one example, a complex environment can include multiple peer hosts or systems, each with one or more logical partitions executing one or more operating systems. In one embodiment, a logical partition is a division of a computing environment's processors, memory and storage into multiple sets of resources, so that each set of resources can be operated independently, with its own operating system instance and one or more applications.

Shared memory communication is a method of inter-process or inter-system communication that allows the exchange of data between processes running at the same time. Systems using shared memory communication can be running on the same host, or different hosts.

Remote direct memory access (RDMA) is a direct shared memory access facility from the memory of one system into that of another, without involving either system's operating system. This permits high-throughput, low-latency networking. RDMA advantageously eliminates the need to copy data between application memory and the data buffers in the operating system. RDMA transfers require no work to be done by the processors, cache or contact switches, and transfers can continue in parallel with other system operations, thereby reducing latency in message transfer.

Recent enhancements include RDMA over Converged Ethernet (RoCE), which is a network protocol that allows remote direct memory access over an Ethernet network. The RoCE protocols define how to use RDMA using Ethernet and User Datagram Protocol (UDP) frames to extend the use of shared memory communication between different systems of a computing environment.

SUMMARY

Certain shortcomings of the prior art are overcome and additional advantages are provided through the provision, in one or more aspects, of a computer program product for facilitating processing within a computing environment. The computer program product includes at least one computer-readable storage medium having program instructions embodied therewith. The program instructions are readable by a processing circuit to cause the processing circuit to perform a method, which includes facilitating shared memory communication between systems of the computing environment capable of communicating over a network using transmission control protocol/Internet protocol (TCP/IP), where a network path between one system and another system of the computing environment passes through one or more routers of the network. The facilitating includes obtaining performance-related data for shared memory communication of the one system with the other system across the network path using a remote direct memory access (RDMA) protocol. Based on the performance-related data, the facilitating includes dynamically determining whether to use the RDMA protocol for shared memory communication of the one system with the other system across the network path, rather than the TCP/IP protocol.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 10A-10B depict one example of facilitating processing within a computing environment, in accordance with one or more aspects of the present invention;

DETAILED DESCRIPTION

Operating system instances (e.g., guests) connecting to the same physical local area network (LAN) can communicate directly using protocols that use remote direct memory access (RDMA) to directly exchange application data without operating system interaction. This approach, such as International Business Machines' Shared Memory Communication-Remote Direct Memory Access (SMC-R) protocol using RDMA-capable network interface controllers (NICs), avoids the overhead of using the transmission control protocol/Internet protocol (TCP/IP) stack to form, exchange, manage (e.g., order, loss, etc.), and process IP packets. RDMA technology is achieving broad acceptance with enhancements such as RDMA over converged Ethernet (RoCE), which allows RDMA to function well over standard Ethernet connections. Initially, RoCE was a Layer 2 solution which required peer hosts to connect to the same physical LAN. This was beneficial, but restricted hosts running on separate subnets from using RDMA technology, since the protocol was not routable.

Figure 1:
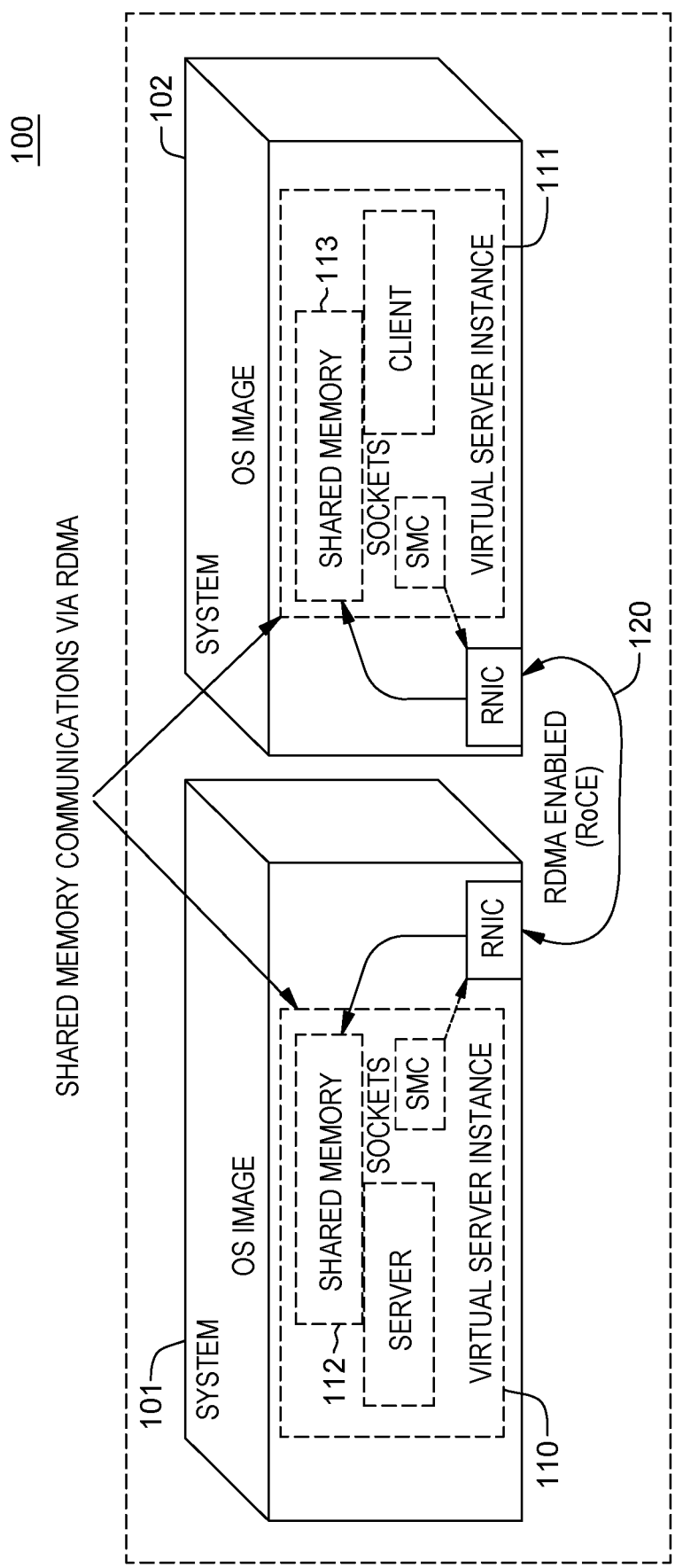
FIG. 1 is an example of a computing environment to incorporate and use one or more aspects of the present invention.

By way of example, FIG. 1 depicts one embodiment of a computing environment 100, where one system 101 and another system 102 communicate, at least in part, using shared memory communication. In one embodiment, system 101 and system 102 are peer systems which include respective virtual server or client instances 110, 111, with shared memory 112, 113. As illustrated, systems 101, 102 can communicate, at least in part, using shared memory communication and memory that each peer system allocates and manages for the other system's use. Advantageously, a shared memory communication connection 120 using RDMA technology provides the capability to allow the systems to logically share memory. The RDMA-enabled protocol defines a means to exploit the shared memory for communications—transparent to the applications. As one example, the above-noted IBM SMC-R protocol is an open socket over RDMA protocol that provides transparent exploitation of RDMA (for TCP-based applications), while preserving key functions and qualities of service from the TCP/IP ecosystem that enterprise-level servers and/or networks depend on. In one embodiment, communicating peer systems (e.g., the TCP/IP stacks) dynamically learn about the shared memory capability using traditional TCP/IP connection establishment flows. With this awareness, the TCP/IP stacks can then switch from TCP network flows to more efficient direct memory access or RDMA flows, as appropriate. In one embodiment, the application programs using TCP sockets are unaware of the transition to shared memory communications.

As explained herein, new RoCE standards have been introduced to enable "routable RoCE", referred to as RoCE v2 or RoCE Layer3 IP connectivity (see IB Annex A17 RoCE v2). The new RoCE Layer 3 IP connectivity is provided via UDP/IP transport (with UDP port 4791 being reserved for RoCE v2). With thus standard RDMA protocols, such as the International Business Machines' SMC-R protocol, can extend their solution to reach SMC-R peers which reside on separate IP subnets. While this increases the reach or footprint of the RoCE v2 solution, by extending the use of shared memory communication to additional workloads, it also introduces questions regarding peer eligibility for aspects related to scope of network limitations, such as maximum distance, latency, number of hops, packet loss, congestion, etc. As the performance of the shared memory communication protocol degrades, it can reach a point of diminishing returns. This tipping point might be based on several factors, which can be user-defined or provided by implementation defaults (e.g., what will the user or system tolerate, priority of the workload, etc.)

An objective of shared memory communication using RDMA-based protocol is to provide optimized input/output technology, which in this case, means optimized network communications between systems of the computing environment. Two issues arise with extending shared memory communications as described herein. One is the scope of the solution that allows for a fluid or a dynamic definition (i.e., what systems fit into a given enterprise ID (EID) might vary). Further, using RDMA-based solutions can require an investment, committing additional system resources, such as system memory, and wasted (non-productive use of) RNIC bandwidth. Note, in this regard, that RNICs are a shared resource and all usage competes for available bandwidth, and therefore, any usage should be productive. If the commitments are made, the benefits need to be realized. However, when the benefits are not being realized, then the system should fall back to another protocol to achieve a more appropriate use of resources (for instance, reducing system memory footprint).

Disclosed herein are computer program products, computer systems and computer-implemented methods, where program code executing on one or more processors facilitates obtaining performance-related data for, for instance, shared memory communication using a remote direct memory access (RDMA) protocol of one system with another system across a network path of the network, and using the performance-related data in dynamically determining whether to use the RDMA protocol for one or more shared memory connections of the one system with the other system across the network path, or to use, for instance, the underlying TCP/IP protocol. The program code disclosed herein, in one embodiment, dynamically determines whether to selectively exclude use of remote direct memory access (RDMA) protocol communication between peer systems, such as across a network path passing through one or more IP routers; that is, where the systems are in different subnets of a computing environment.

As understood by one skilled in the art, program code, as referred to in this application, can include both software and hardware. For example, program code in one or more aspects of the present invention can include fixed function hardware, while other aspects can include a software-based implementation of the functionality described. Certain embodiments can combine both types of program code. One example of program code, also referred to as one or more programs, is depicted as applications 225 or 229 in memory 212 of FIGS. 2B & 2C, as well as programs 218 and computer-readable program instructions 219 in data storage device 217 in the example of FIG. 2A.

Figure 2A:
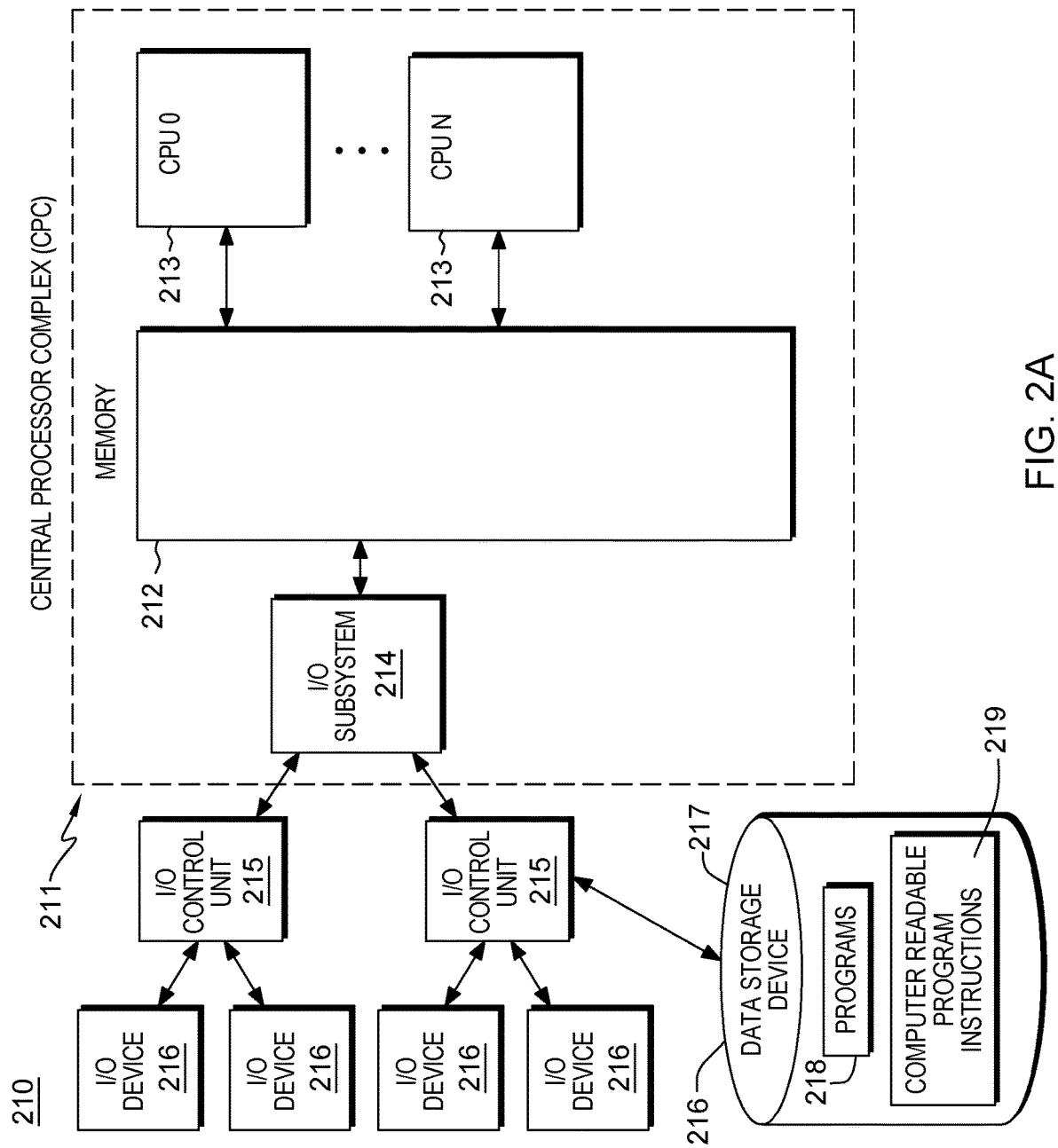
FIG. 2A depicts a further example of a computing environment to incorporate and use one or more aspects of the present invention.

By way of example, FIG. 2A depicts one embodiment of a computing environment to incorporate and use one or more aspects of the present invention. In one embodiment, the computing environment is based on the z/Architecture® instruction set architecture, offered by International Business Machines Corporation, Armonk, N.Y. One embodiment of the z/Architecture instruction set architecture is described in a publication entitled, "z/Architecture Principles of Operation," IBM® Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. (z/Architecture and IBM are trademarks or registered trademarks of International Business Machines Corporation in one or more jurisdictions.)

In one example, a computing environment 210 includes a central processor complex (CPC) 211 (or central electronics complex). Central processor complex 211 includes a plurality of components, such as, for instance, a memory 212 (a.k.a., system memory, main memory, main storage, central storage, storage) coupled to one or more processors (a.k.a., central processing units (CPUs)) 213 and to an input/output (I/O) subsystem 214.

I/O subsystem 214 can be a part of the central electronics complex or separate therefrom. It directs the flow of information between main storage 212 and input/output control units 215 and input/output (I/O) devices 216 coupled to the central electronics complex.

Many types of I/O devices may be used. One particular type is a data storage device 217. Data storage device 217 can store one or more programs 218, one or more computer readable program instructions 219, and/or data, etc. The computer readable program instructions can be configured to carry out functions of embodiments of aspects of the invention.

Central processor complex 211 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 211. Examples include, but are not limited to: microcode, device drivers, redundant processing units, external disk drive arrays, RAID systems, tape drives, and data archival storage systems, etc.

Further, central processor complex 211 can be operational with numerous other general-purpose or special-purpose computing system environments or configurations. Examples of well-known computing systems, environments, and/or configurations that are suitable for use with central processor complex 211 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2C:
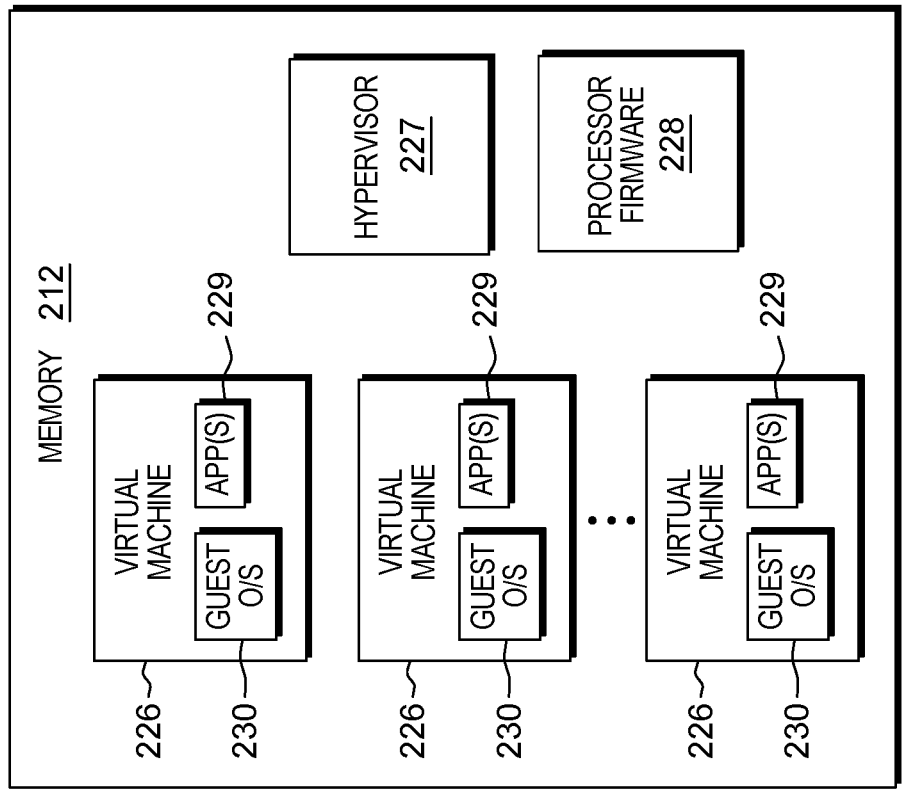
FIG. 2C depicts another example of further details of a memory for the computing environment of FIG. 2A, in accordance with one or more aspects of the present invention.
Figure 2B:
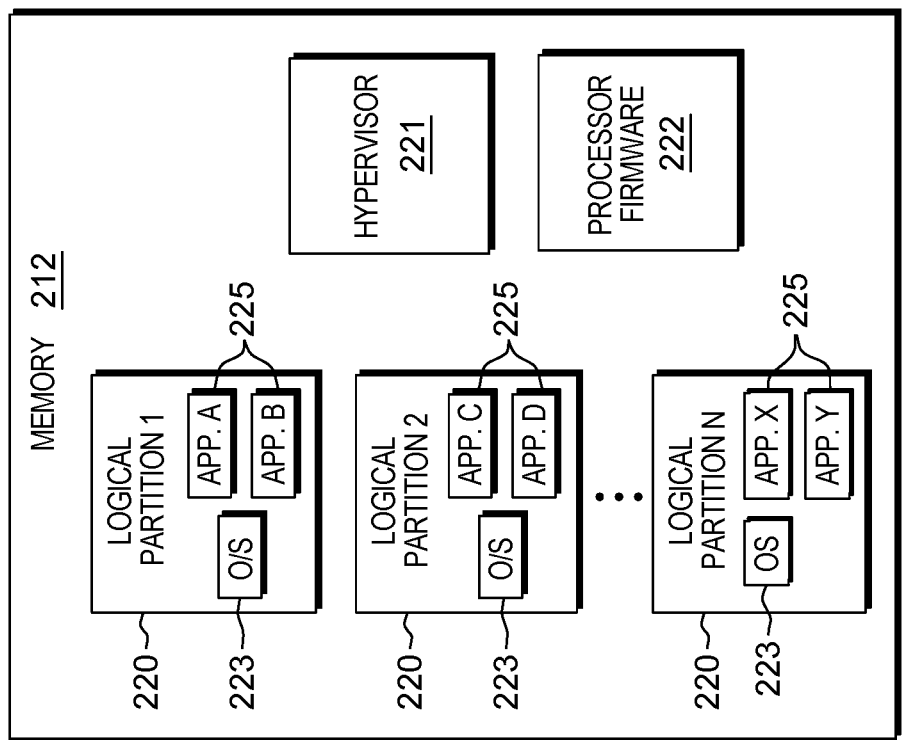
FIG. 2B depicts one example of further details of a memory for the computing environment of FIG. 2A, in accordance with one or more aspects of the present invention.

Central processor complex 211 provides in one or more embodiments logical partitioning and/or virtualization support. In one embodiment, as shown in FIG. 2B, memory 212 includes, for example, one or more logical partitions 220, a hypervisor 221 that manages the logical partitions, and processor firmware 222. One example of hypervisor 221 is the Processor Resource/System Manager (PR/SM™), offered by International Business Machines Corporation, Armonk, N.Y. As used herein, firmware includes, e.g., the microcode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware. (PR/SM is a trademark or registered trademark of International Business Machines Corporation in one or more jurisdictions.)

Each logical partition 220 is capable of functioning as a separate system. That is, each logical partition can be independently reset, run a guest operating system 223 such as the z/OS operating system, offered by International Business Machines Corporation, or other control code, and operate with different application programs 225. An operating system or application program running in a logical partition appears to have access to a full and complete system, but in reality, only a portion of it is available. Although the z/OS operating system is offered as an example, other operating systems offered by International Business Machines Corporation and/or other companies may be used in accordance with one or more aspects of the present invention.

Memory 212 is coupled to CPUs 213 (FIG. 2A), which are physical processor resources that can be allocated to the logical partitions. For instance, a logical partition 220 includes one or more logical processors, each of which represents all or a share of a physical processor resource 213 that can be dynamically allocated to the logical partition.

In yet a further embodiment, the central electronics complex provides virtual machine support (either with or without logical partitioning support). As shown in FIG. 2C, memory 212 of central processor complex 211 includes, for example, one or more virtual machines 226, a virtual machine manager, such as a hypervisor 227, that manages the virtual machines, and processor firmware 228. One example of hypervisor 227 is the z/VM® hypervisor, offered by International Business Machines Corporation, Armonk, N.Y. The hypervisor is sometimes referred to as a host. (z/VM is a trademark or registered trademark of International Business Machines Corporation in one or more jurisdictions.)

The virtual machine support of the central electronics complex provides the ability to operate large numbers of virtual machines 226, each capable of operating with different application programs 229 and running a guest operating system 230, such as the Linux® operating system. Each virtual machine 226 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 3:
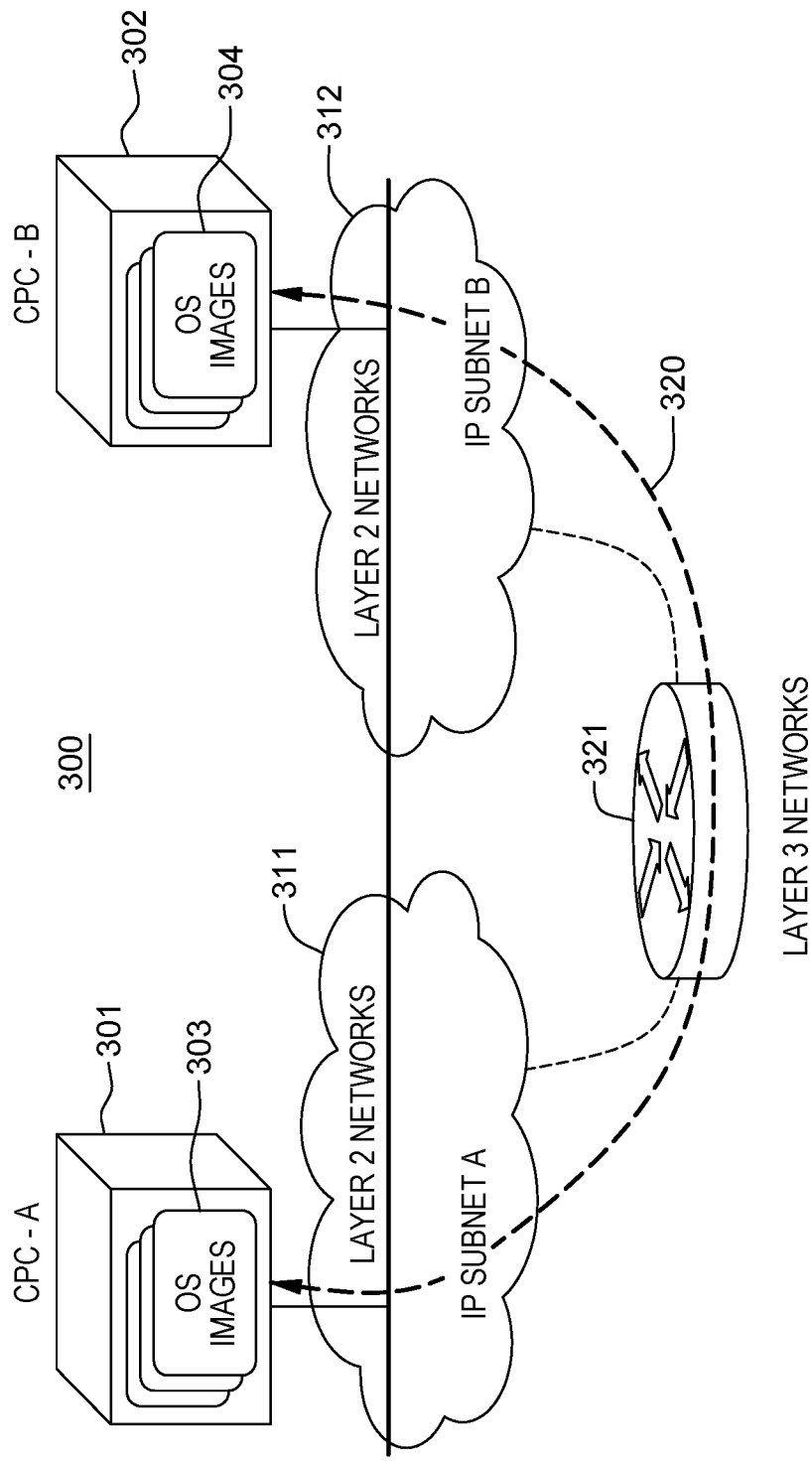
FIG. 3 depicts another embodiment of a computing environment to incorporate and use one or more aspects of the present invention.

By way of example, FIG. 3 depicts an embodiment of a computing environment 300 to incorporate and use one or more aspects of the present invention. In this embodiment, one central processor complex (CPC-A) 301 is associated with an IP subnet A 311, and a second central processor complex (CPC-B) 302 is associated with another IP subnet B 312, with a network path 320 being established across one or more routers 321 of an interconnecting IP network, which allows different systems 303, 304 associated with CPC-A, CPC-B to communicate using shared memory communications via a remote direct memory access (RDMA) protocol, such as the above-noted RoCE v2. With this routable RoCE (i.e., RoCE v2), the RDMA over a Converged Ethernet protocol is no longer limited to use within a single local area network (within a single subnet), and connections are no longer restricted to the same IP subnet. In implementation, the RoCE v2 protocol uses the UDP port 4791 (which is reserved for RoCE v2), and shared memory communication traffic using the remote direct memory access (RDMA) protocol can now cross the IP router(s) 321 encapsulated in UDP/IP packets, which are IP routable.

Communication protocols often have a requirement to define connection eligibility, defining which specific hosts are allowed to communicate using a specific medium, protocol or application. Current communication protocols solve the eligibility problem with various solutions, such as using an out-of-band complex communication manager function (functions such as managers and agents), or require user-defined policies or lists that must be defined, updated and coordinated among the group of systems. The group of systems could be very large (e.g., hundreds of systems), dynamic, and with guest relocations complicating this type of static or semi-static approach.

In one or more embodiments, a shared memory communication protocol can be an enterprise data center solution. However, since connections need no longer be bounded by a single subnet, a new boundary or scope needs to be defined. An RDMA-based protocol and solution can provide the concept of defining or declaring "locality". In particular, the protocol can provide the ability for an administrator to define a "group of systems" that are allowed to use the shared memory communication protocol across unique IP subnets within the concept of a location or logical group. The "logical group" is intended to represent the group of systems within the same general location, which could be a data center, campus, or center spanning sites within relatively close geographic distances. The groups can be very large or small. Further, the shared memory communication groups can be logically divided by business lines, system types (e.g., production versus test or development systems), or other business means. The intent is to find systems that communicate frequently within an enterprise data center (e.g., close proximity data centers).

Figure 4:
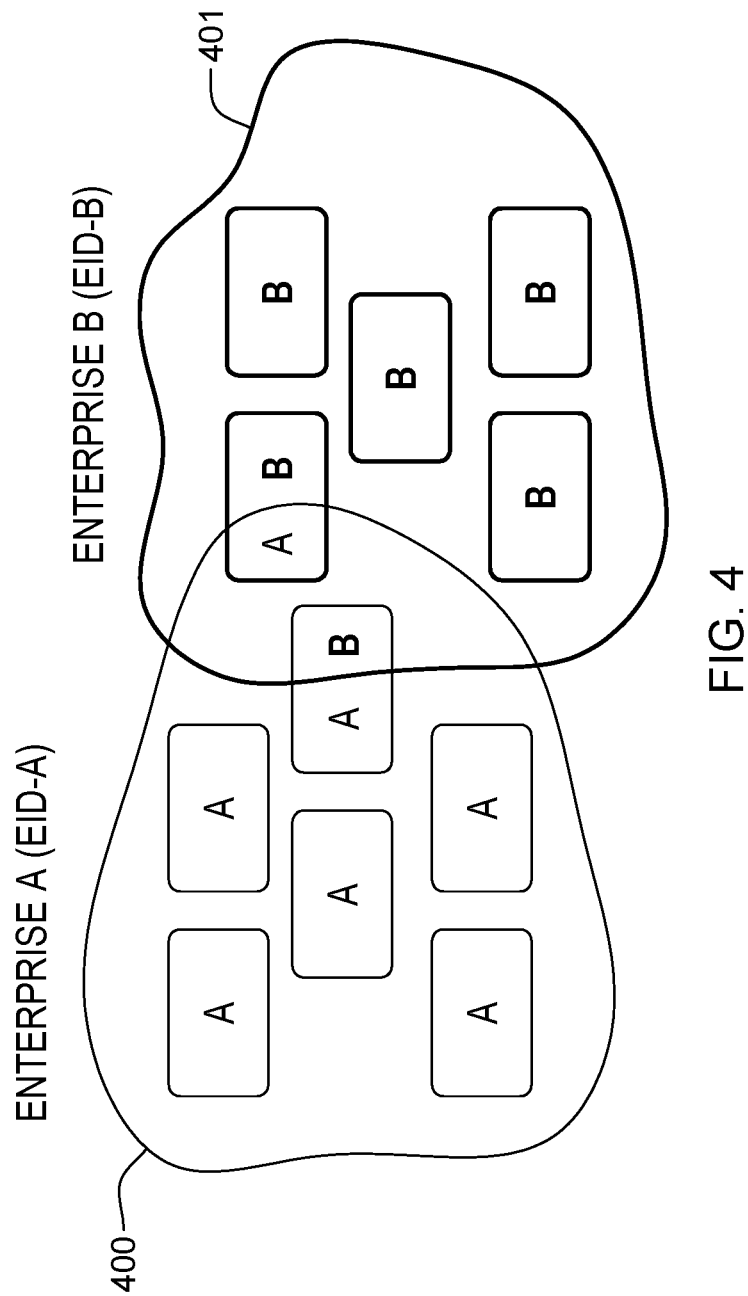
FIG. 4 depicts an example of multiple enterprise system groups of a computing environment to incorporate and use one or more aspects of the present invention.

FIG. 4 depicts one embodiment of an approach for systems to define logical groups, or the scope or limit of shared memory communication via remote direct memory access (RDMA) protocol, as described herein. In particular, FIG. 4 depicts configuring one or more enterprise identifiers (EID) that define a logical group or logical enterprise group. The shared memory communication enterprise ID (EID) example of FIG. 4 includes an EID-A for a first logical group of systems A 400, and an enterprise identifier EID-B for a second logical group of systems B 401, which are each permitted to communicate using, for instance, an RoCE v2-based protocol, over multiple IP subnets. As illustrated in FIG. 4, systems can span multiple logical enterprise groups, in one or more embodiments. In the example of FIG. 4, there are two stacks (or operating systems) which span both EID-A and EID-B. As background, this allows these two nodes to communicate using multi-subnet DMA communications to any nodes in either EID-A or EID-B. Conversely, stacks or operating systems defined to only EID-A or EID-B have restricted DMA communications to nodes defined with the same EID. In one or more embodiments, stacks or operating systems can define multiple EIDs to allow for flexible configurations in DMA communications access.

In implementation, the shared memory communication handshake protocol can include the enterprise ID. For instance, when a client system proposes communication with a server system, the shared memory communication proposal can include the enterprise ID (e.g., EID-A, EID-B in the example of FIG. 4), as can the shared memory communication accept, and shared memory communication confirm messages. In this process, the systems dynamically determine connection eligibility, that is, when the systems' enterprise identifiers match, then shared memory communication using remote direct memory access protocol as described herein (e.g., RoCE v2-based protocol) is eligible to be used.

Note that depending on the implementation, there can be different types of logical groupings. One type is a user-defined logical grouping, which allows guest systems on different platforms to communicate over an IP network across multiple IP subnets using shared memory communication with remote direct memory access protocol. In one implementation, the enterprise ID can be an ID which an administrator defines once and then configures the EID on each stack or operating system. This EID is thus included in the SMC setup (dynamic handshake) processing. Once the SMC EID credentials are exchanged, if a matching EID is detected during the exchange, each endpoint system recognizes that the new multi-subnet remote direct memory access is granted between the two systems. If no matching EIDs are detected, then share memory communication negotiations can try to fall back to the original same-subnet "Layer 2" shared memory communication solution.

Figure 5:
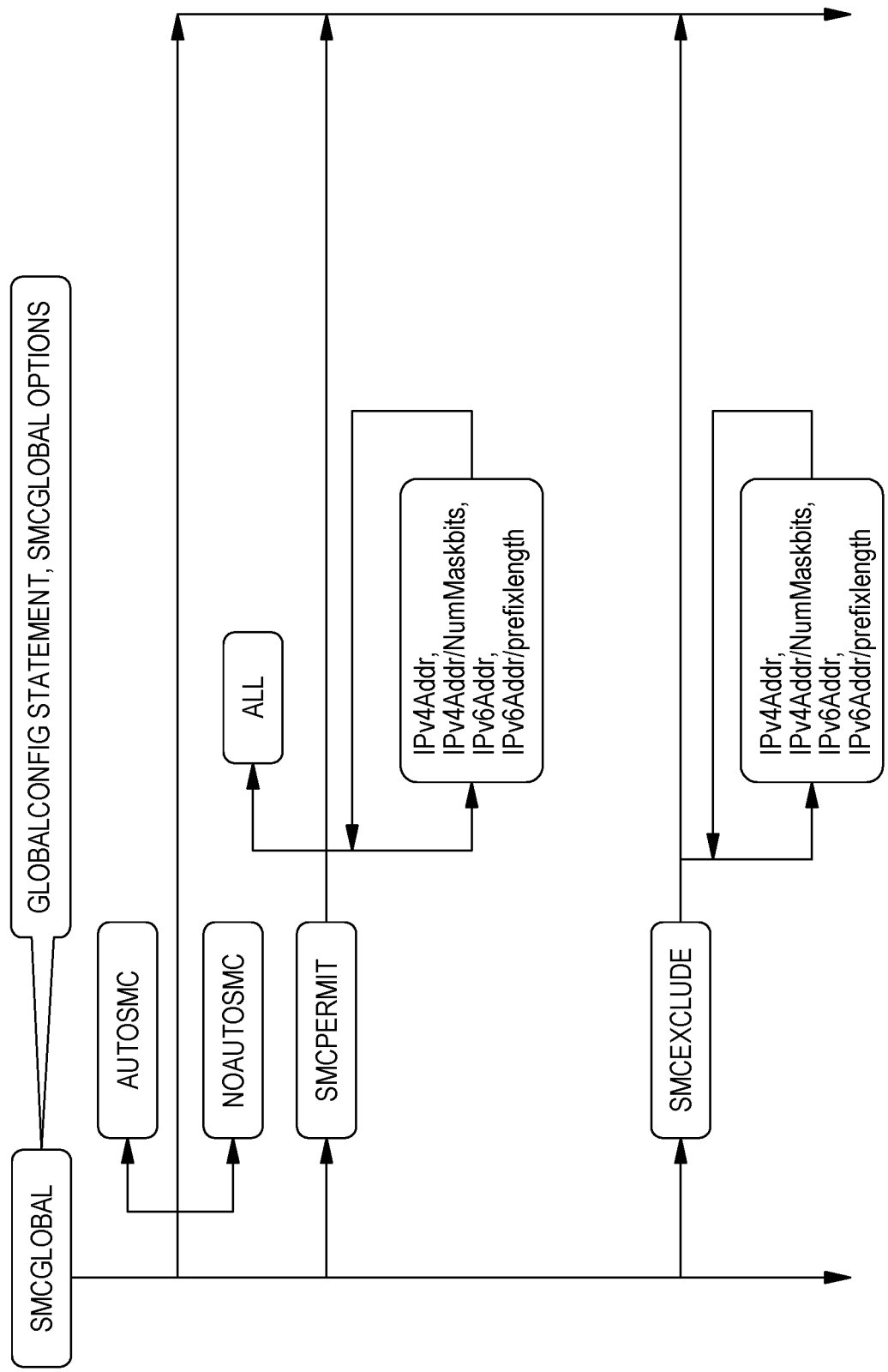
FIG. 5 depicts one embodiment of static shared memory communication filters, which can be used in accordance with one or more aspects of the present invention.

FIG. 5 depicts one example of possible static shared memory communication filters, including a shared memory communication permit (SMCPERMIT) filter and a shared memory communication exclude (SMCEXCLUDE) filter, which allow more granular filtering by the systems in determining whether shared memory communication via remote direct memory access (RDMA) can be used. In one embodiment, the static filters can be configured and replicated using, for instance, any configuration tool which facilitates duplicating definitions across multiple operating system images. In one or more implementations, the share memory communication permit filter can allow users to have strict and more granular control over the access scope for specific peer systems. By way of example, the IP address and/or subnet defined for the filters can be for TCP/IP peer system IP addresses. In one embodiment, the permit filter can default to "permit all". Once any IP address or subnet is configured or permitted, then it becomes (in one embodiment) the only permitted peer in that connection. The exclude filter can allow a user to explicitly exclude, that is, override a permit, of a specific system or a set of specific systems (for instance, where there is a problem or there is a restricted access scenario).

By way of enhancement, disclosed herein is program code for dynamically excluding and/or allowing use of remote direct memory access-based protocol (e.g., an RoCE v2-based protocol) for shared memory communication between peer systems in different subnets of a computing environment. For instance, program code is provided herein for dynamically transitioning from TCP/IP protocol to RoCE v2-based protocol, or from RoCE v2-based protocol to TCP/IP protocol, depending on obtained performance-related data (i.e., performance-related metrics) for shared memory communication using a remote direct memory access (RDMA) protocol by one system with another system across a given network path.

Figure 6:
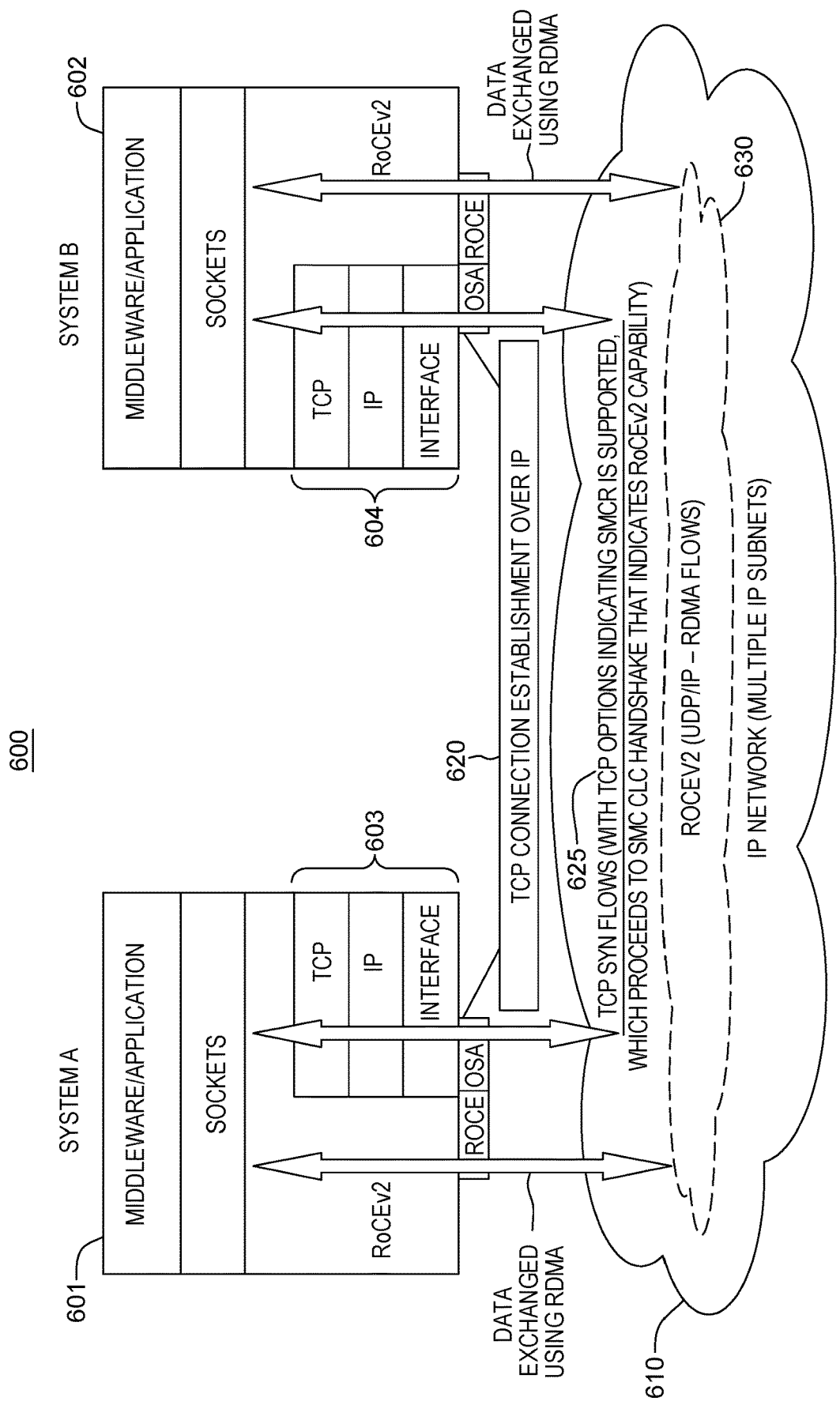
FIG. 6 depicts an example of a computing environment incorporating and using one or more aspects of the present invention.

By way of example, FIG. 6 depicts another embodiment of a computing environment 600 to incorporate and use one or more aspects of the present invention. In this embodiment, one system, system A 601, and another system, system B 602 of, for instance, a group of peer systems in the same logical grouping (i.e., same EID) are illustrated communicating across a network 610, such as an IP network with multiple IP subnets, with system A 601 and system B 602 assumed to be in different IP subnets. Each system includes a TCP/IP stack 603, 604, and has capability to exchange data using remote direct memory access, such as the above-noted RoCE v2 protocol. Initially, a TCP connection is established over IP 620, and TCP synch messages are exchanged, with TCP options indicating that SMCR is supported, which then proceeds to the SMC Connection Layer Control (CLC) handshake that indicates RoCE v2 capability exists 625. Assuming that the handshake messages indicate RoCE v2 capability, then the systems dynamically transition from TCP/IP communication to shared memory communication using remote direct memory access (RDMA) protocol, such as RoCE v2, which results in UDP/IP—remote direct memory access communication flows between the systems, where data is exchanged using RDMA, thereby avoiding the TCP/IP stacks of the systems and enhancing communication.

As noted, in one or more embodiments, the user is required to only enable RoCE v2 eligible peer systems to control access based on need, distance, latency (average round-trip time), number of router hops, etc. This opens up the possibility of systems connecting using shared memory communication via a remote direct memory access protocol, which may result in sub-optimal performance due to the network environment or configuration between the systems. Generally, connections that must traverse long distances or encounter network bottlenecks (congestion), or that traversed multiple network routers, can be subject to packet loss and high latency. These types of connections might be better served using other protocols, such as the TCP protocol, and not RoCE v2.

In one or more embodiments, the present invention includes program code which facilitates shared memory communication between systems of a computing environment capable of communicating over a network using transmission control protocol/Internet protocol (TCP/IP). A network path is established between one system and another system of the computing environment passing through one or more routers of the network (such that the systems are in different IP subnets), and the facilitating includes obtaining performance-related data for shared memory communication of the one system with the other system across the network path using a remote direct memory access (RDMA) protocol. Based on the performance-related data, the facilitating includes dynamically determining whether to use the RDMA protocol for shared memory communication of the one system with the other system across the network path, rather than the TCP/IP protocol.

In one or more implementations, based on the performance-related data exceeding one or more specified acceptable thresholds, the facilitating includes determining not to use the RDMA protocol for shared memory communication of the one system with the other system across the network path, and dynamically adding an identification associated with the other system (such as an identification of the system or the connection to the system) to an exclude data structure, where the exclude data structure identifies one or more systems for which RDMA protocol communication is dynamically excluded from use (at least temporarily) by the one system, and to proceed to use the TCP/IP protocol for the shared memory communication of the one system with the other system across network path. In one embodiment, the dynamically adding includes dynamically adding for a defined time interval the other system identification to the exclude data structure. Further, in one or more embodiments, the facilitating can include dynamically redetermining, based on expiration of the defined time interval, whether to use the RDMA protocol for one or more shared memory communications of the one system with the other system across the network path. In one embodiment, the defined time interval is user-configurable.

In one or more implementations, the one system and the other system are in different subnets of the network, and the performance-related data includes a count of one or more routers across which the network path between the one system and the other system passes.

In one or more embodiments, the obtaining and the dynamically determining are performed by the one system, and the obtaining includes using the RDMA protocol for shared memory communication of the one system with the other system across the network path, and based on the using, collecting the performance-related data. By way of example, the performance-related data can include one or more of round-trip time data for shared memory communication by the one system with the other system across the network path using the RDMA protocol, packet loss rate data for the shared memory communication of the one system with the other system across the network path using the RDMA protocol, or data indicative of network congestion during the shared memory communication of the one system with the other system across the network path using the RDMA protocol.

In one or more implementations, the facilitating further includes establishing a new connection between the one system and the other system across the network path, where the establishing includes determining whether the other system is listed in an exclude data structure identifying one or more systems of the computing environment for which RDMA protocol communication is, or is temporarily, excluded from use by the one system, meaning that the TCP/IP protocol is to be used, at least temporarily, for shared memory communication between the one system and the other system across the new connection.

Embodiments of the present invention are inextricably tied to computing and provide significantly more than existing approaches to processing within a computing environment. For instance, embodiments of the present invention provide program code to exploit the interconnectivity of various systems and processes, as well as utilize various computing-centric data analysis and handling techniques in order to facilitate shared memory communication between peer systems of a computing environment, where the systems are capable of communicating over a network using transmission control protocol/Internet protocol (TCP/IP), as well as shared memory communication using a remote direct memory access (RDMA) protocol. The processing is facilitated by dynamically determining when use of the RDMA protocol results in sub-optimal performance, and when detected, transitions the shared memory communication from the RDMA protocol to the TCP/IP protocol. Both the interconnectivity of computing systems utilized and the computer-exclusive data processing techniques utilized by the program code, enable various aspects of the present invention. Further, embodiments of the present invention provide significantly more than any existing approaches for shared memory communication between peer systems in a computing environment where the systems are in different subnets.

In one or more embodiments, program code within an RoCE v2 group defined by an EID is provided, which does not require additional user-configuration to implement dynamic excluding of use of RDMA protocol communication between systems with inefficient or suboptimal network paths between them. In one embodiment, program code tracks one or more peer system communication or data metrics, with a mechanism to also save the network metrics. Using the obtained metrics, or performance-related data, each peer system's performance is periodically evaluated. Based on the data, the program code can dynamically detect suboptimal performance of communication between peer systems, and one or more of the suboptimal peers can be added to an exclusion list, at least temporarily removing the particular peer system from the EID or logical group relative to a given host system perspective. Further, the specific metrics or reason for excluding the peer host system can be reported to that system. Processing can continually chose the optimal network protocol between peers within the EID group, based on the current exclusion list. Further, the exclusion list can be periodically reopened to allow excluded systems back into the logical group on a trial basis, recognizing that suboptimal performance can be caused by temporary conditions within the network.

In one or more implementations, disclosed herein are a computer program product, computer system and computer-implemented method, where program code implements a mechanism for a shared memory communication-enabled system to analyze real-time metrics of the network path or connection between two host systems. When a system discovers the connection would provide suboptimal performance by using, for instance, an RoCE v2-based protocol, the system dynamically switches new connections to use TCP/IP protocols. In one embodiment, a connection path can be considered suboptimal for RoCE v2 when there is high packet loss. For instance, suboptimal performance can be detected where packet loss exceeds a prespecified acceptable threshold, such as 1% for an RoCE v2 link. Further, the performance-related data can include average round-trip time data. A high average round-trip time is indicative of a network being a high-latency network. For instance, where the connection round-trip time exceeds a prespecified acceptable threshold, such as 100 microseconds, the connection or network path may be considered suboptimal. As another attribute, the number of router hops can be considered. Where the network connecting the systems is a long distance network, and the connection passes through multiple IP network routers, the connection can be considered suboptimal for shared memory communication using an RDMA protocol. For instance, the number of router hops exceeding a predetermined threshold, such as above ten router hops, can result in the connection being considered suboptimal. Further, in one or more implementations, the performance-related data can include congestion data. Where there is evidence of excessive congestion on the network path or connection, the connection can be considered suboptimal. For instance, congestion control algorithms exceeding a specified threshold for the frequency of requiring reduced network flow (frequent back-pressure) can be indicative of unacceptable network congestion, result in suboptimal performance.

Based on the performance-related data obtained, program code can implement intelligent selection for the most optimal shared memory communication protocol for, for instance, a new connection. By monitoring the number of packet retransmissions due to packet loss, by tracking connection round-trip time (RTT) and time-to-live (TTL), (router hop count), a host system can determine whether the network has high latency and/or a long distance between peer systems. Further, tracking congestion control behavior can be used as indicative of whether there is a suboptimal performance on the network path. A host system can then mark future connections that would use the suboptimal connection to use TCP/IP, rather than, for instance, RoCE v2-based protocol. These connections might be identified by the ports, IP address or routes they would use. Disclosed herein is a mechanism for users to control the type of action this monitoring can take. For example, a user might configure what RTT is to be considered suboptimal for RoCE v2. Likewise, configuration options for pack retransmissions and TTL can be provided for use by the program code perform eligibility autonomics, such as disclosed herein.

Figure 7:
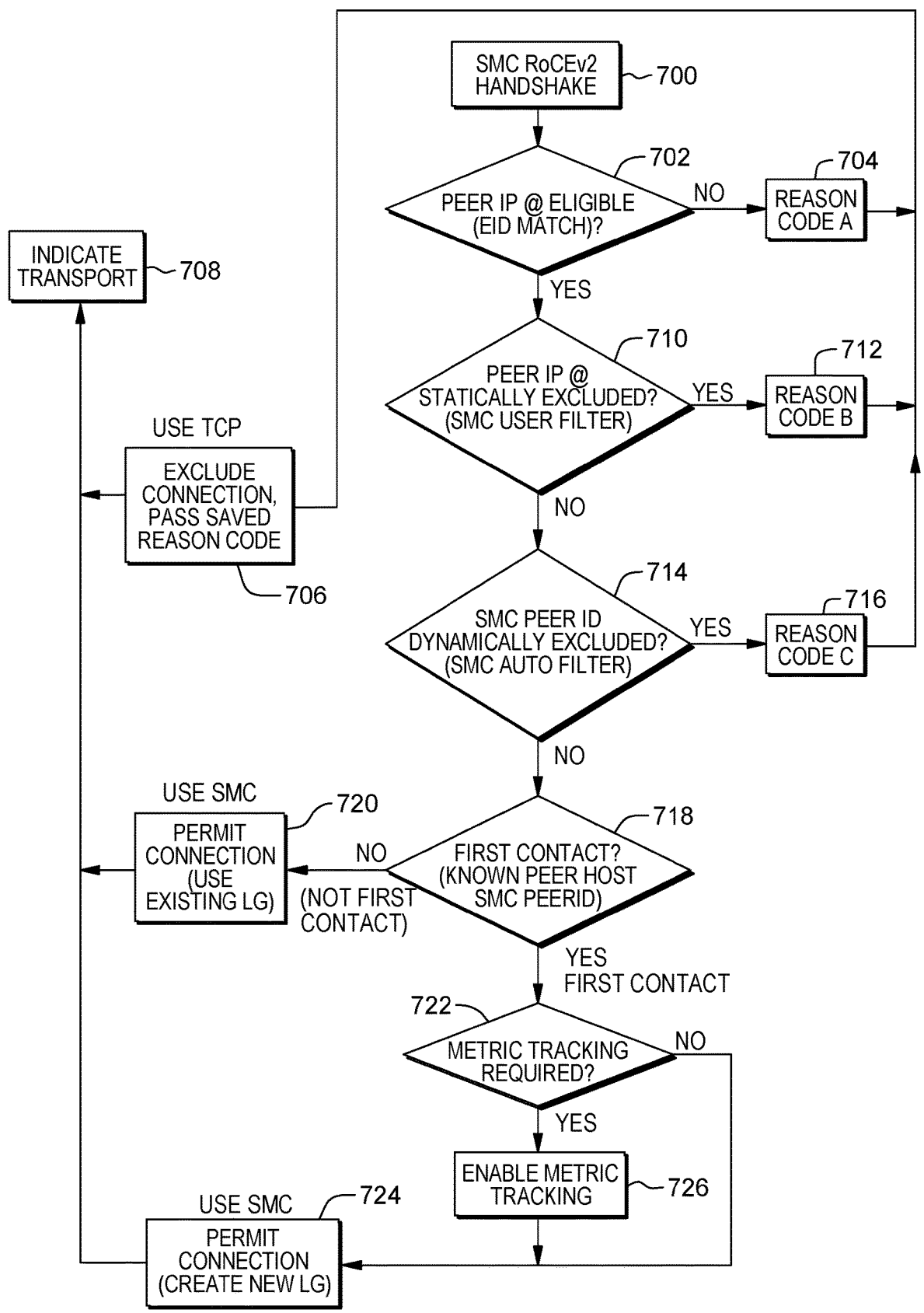
FIG. 7 depicts one embodiment of a workflow illustrating certain aspects of one or more embodiments of the present invention.

FIG. 7 depicts one embodiment of a workflow illustrating certain aspects of one or more embodiments of the present invention. As illustrated, the shared memory communication RoCE v2 handshake 700 is performed between the peer systems, such as a SMC Connection Layer Control (CLC) (three-way) handshake. Assuming that the systems support shared memory communication using RoCE v2, processing determines whether the system identifiers match, that is, whether the peer IP is eligible for shared memory communication using RDMA protocol 702. If "no", then a reason code, reason code A 704 is provided, indicative that the EIDs do not match, meaning that the systems are in different logical groups. Assuming that the systems are not in the same logical group, then the connection is excluded from shared memory communication using the RDMA protocol, with the reason code being saved 706, in one embodiment, and with transport indicated as TCP/IP 708 for the connection.

Assuming that the logical group identifier matches, then processing determines whether there is a static filter that excludes using shared memory communication via RDMA protocol as described herein 710. If "yes", then a reason code B 712 is provided, which indicates that the shared memory communication exclude filter for this IP subnet address indicates that RoCE v2 is unavailable, for instance, meaning that the administrator has excluded the particular IP address from that type of communication. The reason code can be saved 706, and the connection excluded from using RoCE v2, with transport indicated to be TCP/IP. Assuming that shared memory communication is not statically filtered or excluded, then processing determines whether shared memory communication has been dynamically excluded using performance-related data such as described herein 714. This type of filter is considered an automatic or dynamic shared memory communication filter. If "yes", then reason code C 716 is provided, where reason code C indicates that the dynamic exclude filter identifies that this peer host system should not use shared memory communication based on RDMA protocol (e.g., due to resent history of suboptimal performance on the connection or network path). The reason code C is then saved 706, and the connection is excluded from RoCE v2, at least temporarily, with the transport indicated to be TCP (RC) 708.

Assuming that the connection is not automatically excluded from using RoCE v2, then the server side processing determines whether this is the first contact with this peer between the two systems 718, and if not, then shared memory communication is permitted using the existing Link Group (LG) 720, which is provided or indicated as the transport protocol 708. Note that SMC-R Link Group (LG) is the logical pipe (i.e., connection) between two hosts (TCP client and server). Within an LG, there are two links for redundancy. All TCP connections between the two hosts reuse the same LG, which is set up once and then persists. In one or more implementations, the LG is what is evaluated for performance, that is, as the connection between the hosts. TCP connections can begin and end, but the LG remains. When a new TCP connection is created, processing first checks to see if this is a first contact (FC) with this peer host. If not, then there is an existing LG. Otherwise, it is a first contact (FC), and a new LG is created. Assuming that contact is a first contact, then processing also determines whether performance-related data tracking is required. If "yes", then metric tracking is enabled 726, and an RoCE v2 connection is permitted, creating a new LG 724, which is indicated as the transport 708. Note that similar validation can be repeated on the client side to obtain concurrence that this is FC and to verify that the client has not excluded communications with the server for similar network performance reasons.

Note that, in one or more implementations, FIG. 7 depicts processing for the host server-side of a connection. In one implementation, the server-side always decides if this is a first contact (FC), in which case the LG is reused, or a new one is to be created, in the case of a first contact. The client-side host does not need to repeat this first contact decision, but the client-side host should validate that it agrees that this is or is not a first contact host. The logic to exclude a particular peer host can be implemented in both the client-side and server-side logic.

While the concept of a link group identifier is advantageous, it also introduces questions above peer eligibility for aspects related to network limitations, such as maximum distance, latency, number of router hops, packet loss, etc. As a performance of the optimized communication protocol (e.g., RDMA-based protocol) degrades, it reaches the point of diminishing returns. This tipping point might be based on several factors, and some factors could be user-defined or set by default, such as what will the user tolerate, priority of the workload, day of the week, time of the day, etc.

Provided herein are new configuration options for users to indicate want the shared memory communication protocol stack is to analyze, and take action based on the analysis, evaluating the TCP workload suitability for use of the RoCE v2-based protocol. Note that aspects disclosed herein allow this implementation of the analysis without requiring additional configuration of the systems. Further, optional configuration options could be provided for users to specify the thresholds for not using the remote direct memory access protocol, such as the smooth round-trip time (SRTT). If this value is not selected, an acceptable default value can be used (e.g., 100 microseconds). Further, in one or more embodiments, the stack can track inbound TCP connection round-trip times (RTT) to individual servers. The stack can also maintain a smooth RTT (SRTT) to make eligibility decisions using newly established TCP connections. The SRTT can be used so that processing does not overreact to temporary network congestion.

In one or more embodiments, an optional configuration is provided for the user to specify an acceptable threshold percentage of packet retransmissions. If the value is not selected, then an acceptable default value can be used (e.g., 1%). With this option configured, the stack can track RoCE v2 packet retransmissions, and a total number of RoCE v2 packets transmitted.

In one or more embodiments, a configuration option can be provided for a user to specify the suitability threshold for the number of network IP hops between connection peers. If this value is not selected, an acceptable default value can be used (e.g., 10 network hops). With this option configured, the stack tracks the number of IP hops between two peer systems using the time-to-live (TTL) value of the active TCP connection peer.

In one embodiment, an optional congestion control threshold can be provided. For instance, how often back-pressure was required on a given link network path can be monitored.

In one embodiment, the stack can keep a count, per peer host (typically based on a Peer ID) of the number of time intervals that the Link Group (LG) exceed and/or fall below the set threshold for suitability for use of RoCE v2. The metrics will come from each of the RoCE v2 links (IP connections) and they are accumulated for both links within the LG. LGs that exceed the thresholds can be counted as not suitable for shared memory communication using RDMA (i.e., RoCE v2), and LGs that are equal or less than the threshold can be counted as suitable. When the LG exceeds performance thresholds, then the Peer ID can be dynamically added as a new exclude filter. This prevents future connections from using SMC-Rv2 with this peer host.

For LGs where the metrics are not suitable for RDMA (i.e., network traffic over this LG exceeds suitable thresholds), then the stack will set an indicator in the representation for the peer host (such as the Peer ID) control block indicating that connections to the peer host are to use TCP, and not shared memory communication via RDMA protocol. For every subsequent inbound connection to the same host (server), the stack will check this indicator and respond, indicating that this connection is to use TCP/IP protocol. If a peer host is being blocked from using shared memory communication via RDMA protocol eligibility due to one or more of these thresholds not being met, then the stack can periodically (e.g., every 30 minutes) reset the indicator (delete the exclude filter) used to grant shared memory communication via RDMA protocol access. Once the stack deletes the exclude filter, allowing SMC-Rv2 to be reused again, it can essentially accept the new LG on a probational basis (e.g., with close monitoring). This will allow the stack to reevaluate shared memory communication for a given host peer in case network conditions have changed.

In one or more implementations, shared memory communication using RDMA protocol can be based on whether an individual metric of multiple metrics exceeds a corresponding absolute maximum threshold, or, for instance, whether two or more, or a majority of the metrics being monitored exceed a respective threshold, or together exceed a composite threshold, for instance, three out of four data metrics.

Figure 8:
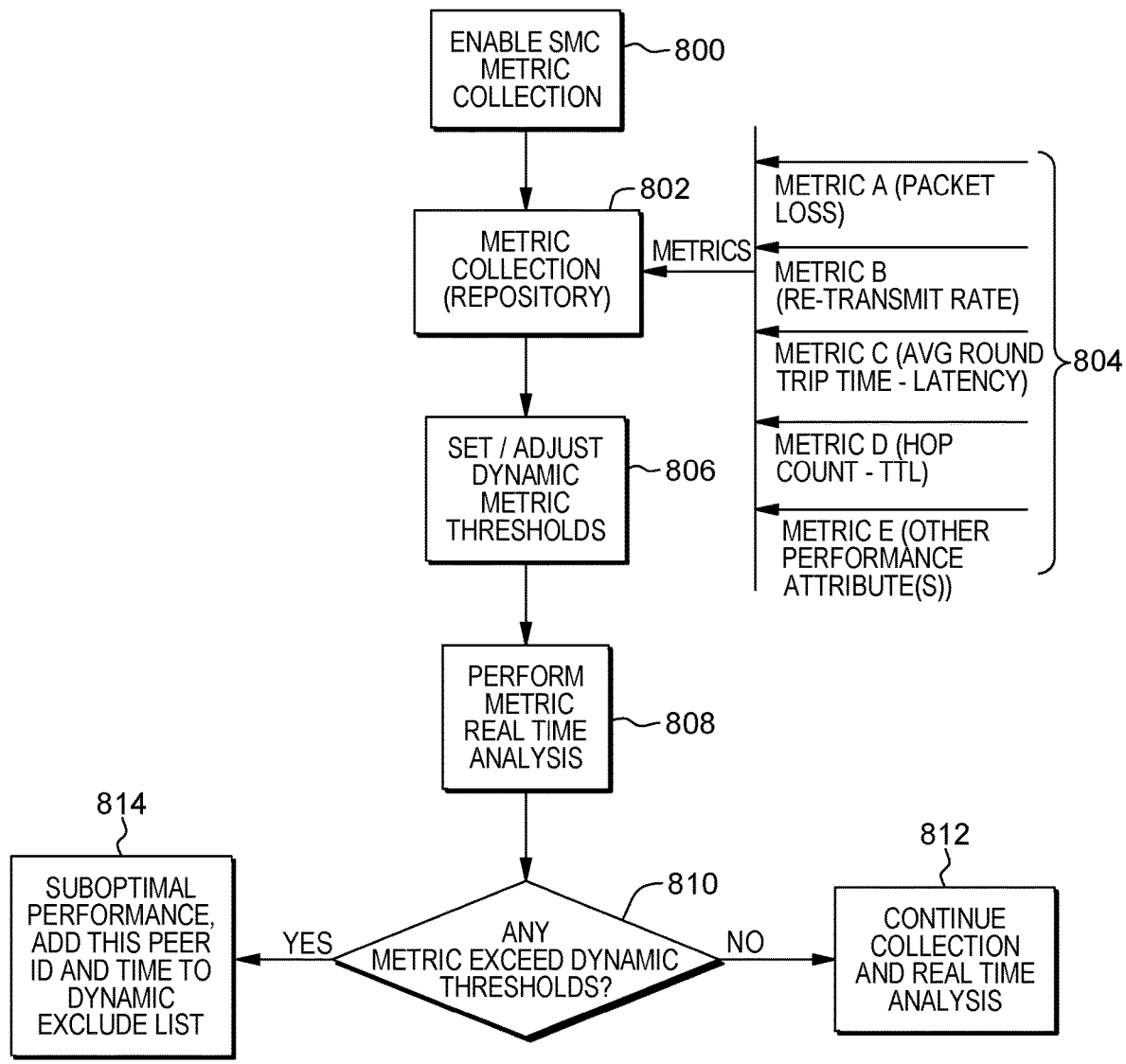
FIG. 8 illustrates another embodiment of a workflow illustrating certain aspects of one or more embodiments of the present invention.

By way of example, FIG. 8 illustrates another embodiment of a workflow illustrating certain aspects of one or more embodiments of the present invention.

Referring to FIG. 8, when performance-related data or metric collection is enabled 800, performance-related data (or metric data) is collected and, for instance, added to a repository 802. In one implementation, the data can include one or more types of performance-related data, including a data metric A related to packet loss, a data metric B related to a re-transmit rate, a data metric C related to an average round-trip time latency, a data metric D related to a router hop count in the network path, or a data metric E relating to one or more other performance attributes 804. In addition to collecting the performance-related data, one or more acceptable thresholds are set or predefined for one or more of the performance-related data types 806. For instance, one or more of the thresholds can be user-adjustable. Real-time or dynamic analysis of the performance-related data is performed by the system to evaluate, for instance, each peer system connection 808. Processing determines whether any metric threshold is exceeded by the respective dynamically performance-related data 810. If "no", then collection of real-time performance data continues along with analysis of the data 812. Otherwise, suboptimal performance is identified, and the associated system identification and time of the suboptimal performance is added to the dynamic exclude list, which as noted, can have a time interval associated therewith, after which the connection is reevaluated 814.

Figure 9:
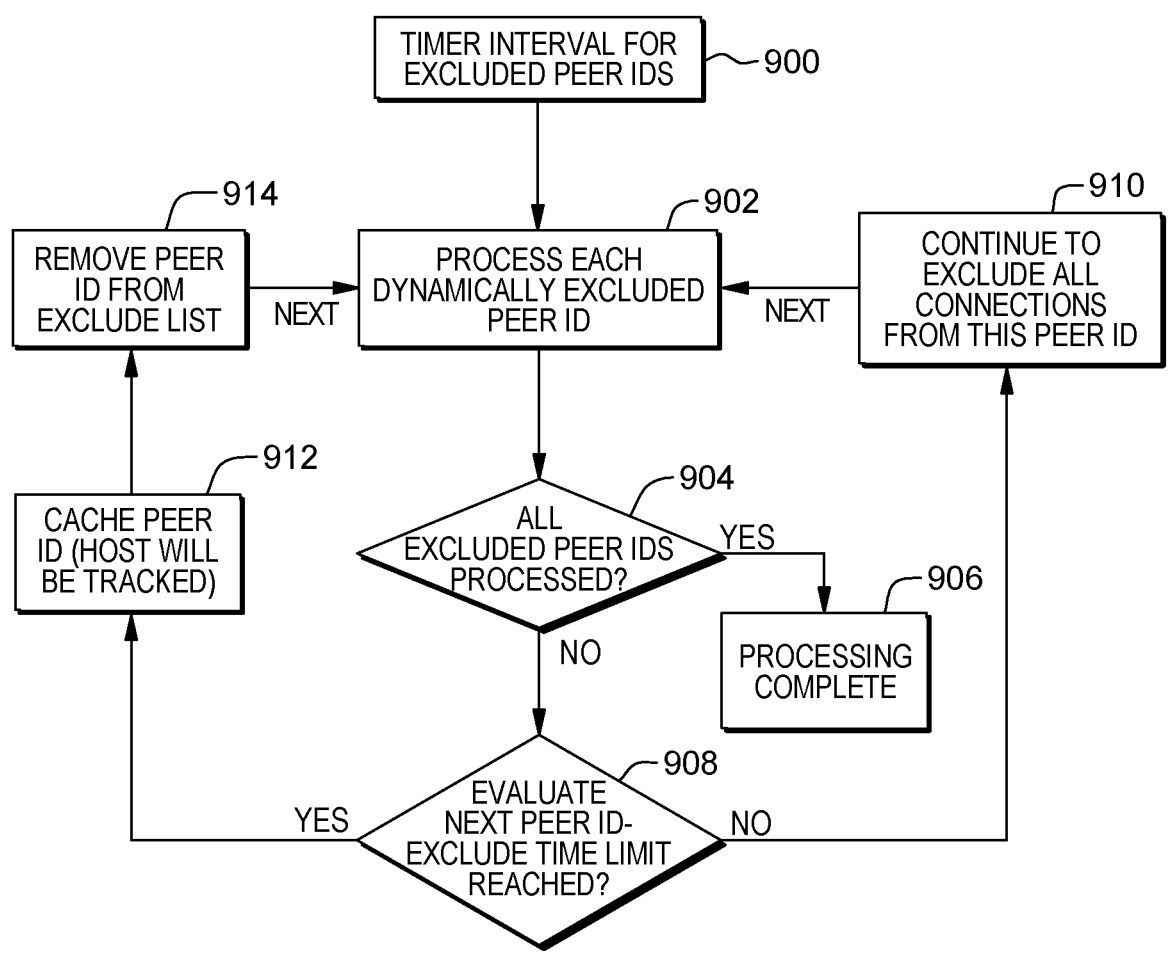
FIG. 9 depicts a further embodiment of a workflow illustrating certain aspects of one or more embodiments of the present invention.

As noted, in one or more embodiments, where a server port is being blocked as to shared memory communication eligibility due to one or more of the thresholds not being met, the stack can periodically (e.g., at fixed intervals) reset the metric variables used to grant access to the RDMA-based protocol. FIG. 9 depicts one embodiment of a workflow illustrating certain aspects of this concept. In FIG. 9, a timer interval for excluded peer IDs is set 900, and each dynamically-excluded peer ID is processed 902, which includes determining whether all excluded peer IDs have been processed 904, and if not, the next peer ID is evaluated to determine whether the exclude time limit has been reached 908. If not, the system continues to exclude all connections from this peer system 910. If the time limit has been reached, then the peer system ID will be cached (that is, the host system will be tracked) 912, and the peer system ID is removed from the exclude list or data structure 914. Once all excluded peer IDs have been processed from the list or data structure, then the processing is complete 906.

Another embodiment of facilitating processing within a computing environment, as it relates to one or more aspects of the present invention, is described below with reference to FIGS. 10A-10B.

Referring to FIG. 10A, in one embodiment, the method includes facilitating shared memory communication between systems of a computing environment capable of communicating over a network using transmission control protocol/Internet protocol (TCP/IP), where a network path between one system and another system of the computing environment passes through one or more routers of the network 1000. The facilitating includes obtaining performance-related data for shared memory communication of the one system with the other system across the network path using a remote direct memory access (RDMA) protocol 1002. Based on the performance-related data, there is a dynamic determination whether to use the RDMA protocol for shared memory communication of the one system with the other system across the network path, rather than the TCP/IP protocol 1004.

In one embodiment, based on the performance-related data exceeding one or more specified acceptable thresholds, the processing determines not to use the RDMA protocol for shared memory communication of the one system with the other system across the network path, and dynamically adds an identification associated with the other system (e.g., a system identification, a port identification, a connection identification) to an exclude data structure, where the exclude data structure identifies one or more systems for which RDMA protocol communication is dynamically excluded from use by the one system 1006, and TCP/IP protocol is used for the shared memory communication of the one system with the other system across the network path 1008.

In one embodiment, the dynamically adding includes adding for a defined time interval the other system identification to the exclude data structure 1010. Further, in one or more implementations, the process includes dynamically redetermining, based on expiration of the defined time interval, whether to use the RDMA protocol for one or more shared memory communications of the one system with the other system across the network path 1012. In one embodiment, the defined time interval is a user-configurable interval 1014.

As illustrated in FIG. 10B, in one embodiment, the one system and the other system are in different subnets of the network, and the performance-related data includes a count of one or more routers across which the network path passes between the one system and the other system 1016.

In one or more implementations, the obtaining and the dynamically determining are by the one system 1018, and the obtaining includes using the RDMA protocol for the shared memory communication of the one system with the other system across the network path 1020, and based on the using, collecting the performance-related data 1022.

In one embodiment, the performance-related data includes one or more of round-trip time data for shared memory communication by the one system with the other system across the network path using the RDMA protocol, packet loss rate data for the shared memory communication of the one system with the other system across the network path using the RDMA protocol, or data indicative of network congestion during the shared memory communication of the one system with the other system across the network path using the RDMA protocol 1024.

In one embodiment, the facilitating further includes establishing a new connection between the one system and the other system across the network path, where the establishing includes determining whether the other system is listed in an exclude data structure identifying one or more systems of the computing environment for which RDMA protocol is, at least temporarily, excluded from use by the one system, meaning that the TCP/IP protocol is to be used, at least temporarily, for shared memory communication between the one system and the other system across the new connection 1026.

Figure 11A:
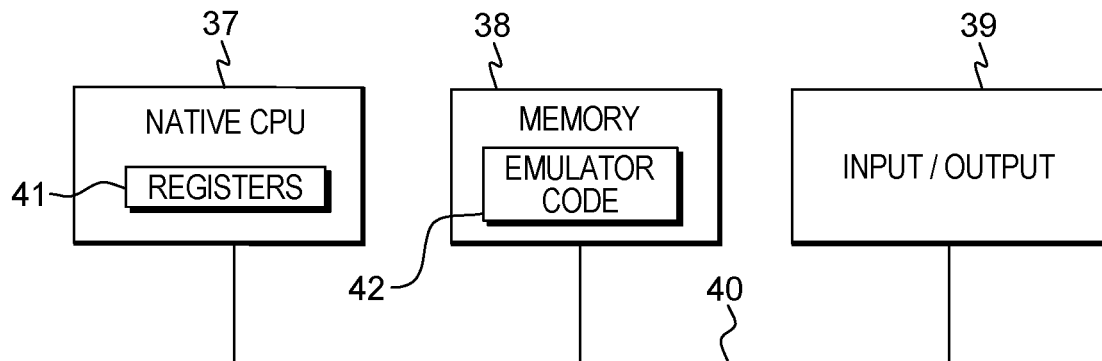
FIG. 11A depicts another example of a computing environment to incorporate and use one or more aspects of the present invention.

Another embodiment of a computing environment to incorporate and use one or more aspects of the present invention is described with reference to FIG. 11A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, N.Y.; an HP Superdome with Intel® Itanium® II processors offered by Hewlett Packard Co., Palo Alto, Calif.; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 11B:
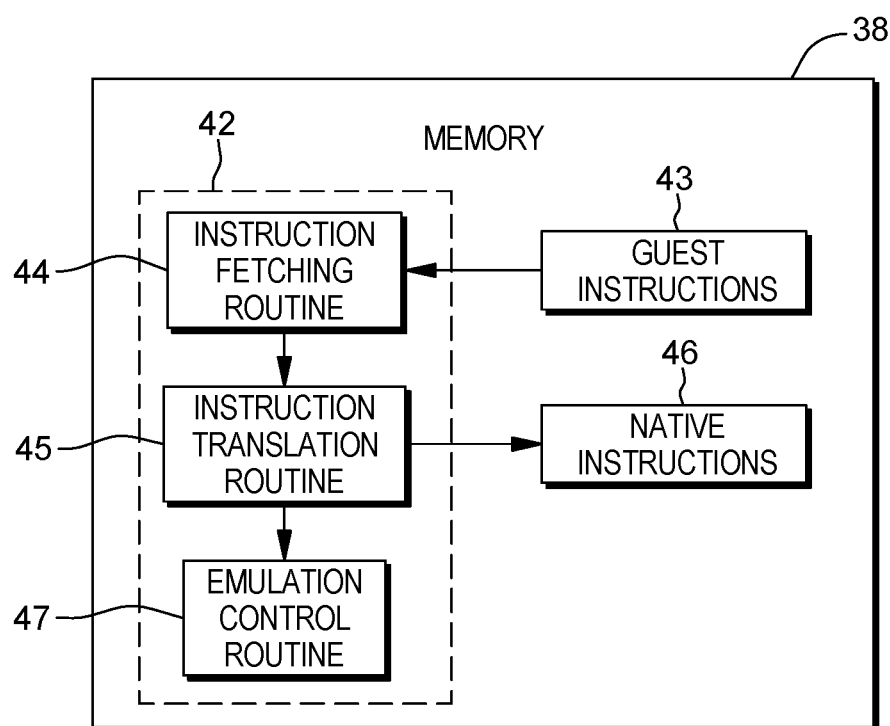
FIG. 11B depicts further details of the memory of FIG. 11A, in accordance with one or more aspects of the present invention.

Further details relating to emulator code 42 are described with reference to FIG. 11B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture hardware architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

One instruction that may be emulated is the Reset Dynamic Address Translation Protection instruction described herein, in accordance with an aspect of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
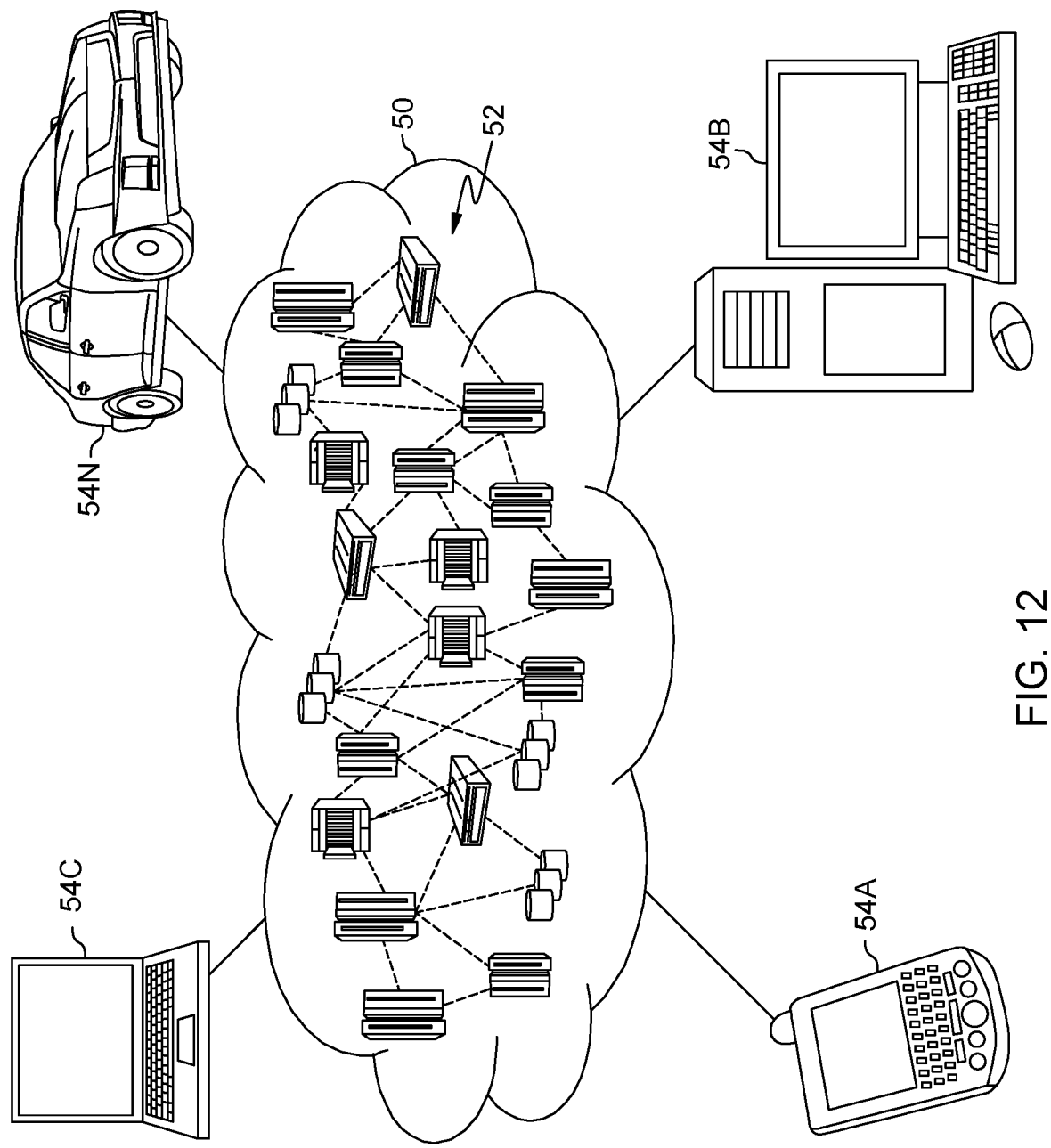
FIG. 12 depicts one embodiment of a cloud computing environment, in accordance with one or more aspects of the present invention.

Referring now to FIG. 12, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 52 and cloud computing environment 50 can communicate with any type of computerized device over any type of network and/or network addressable connection (e.g., using a web browser).

Figure 13:
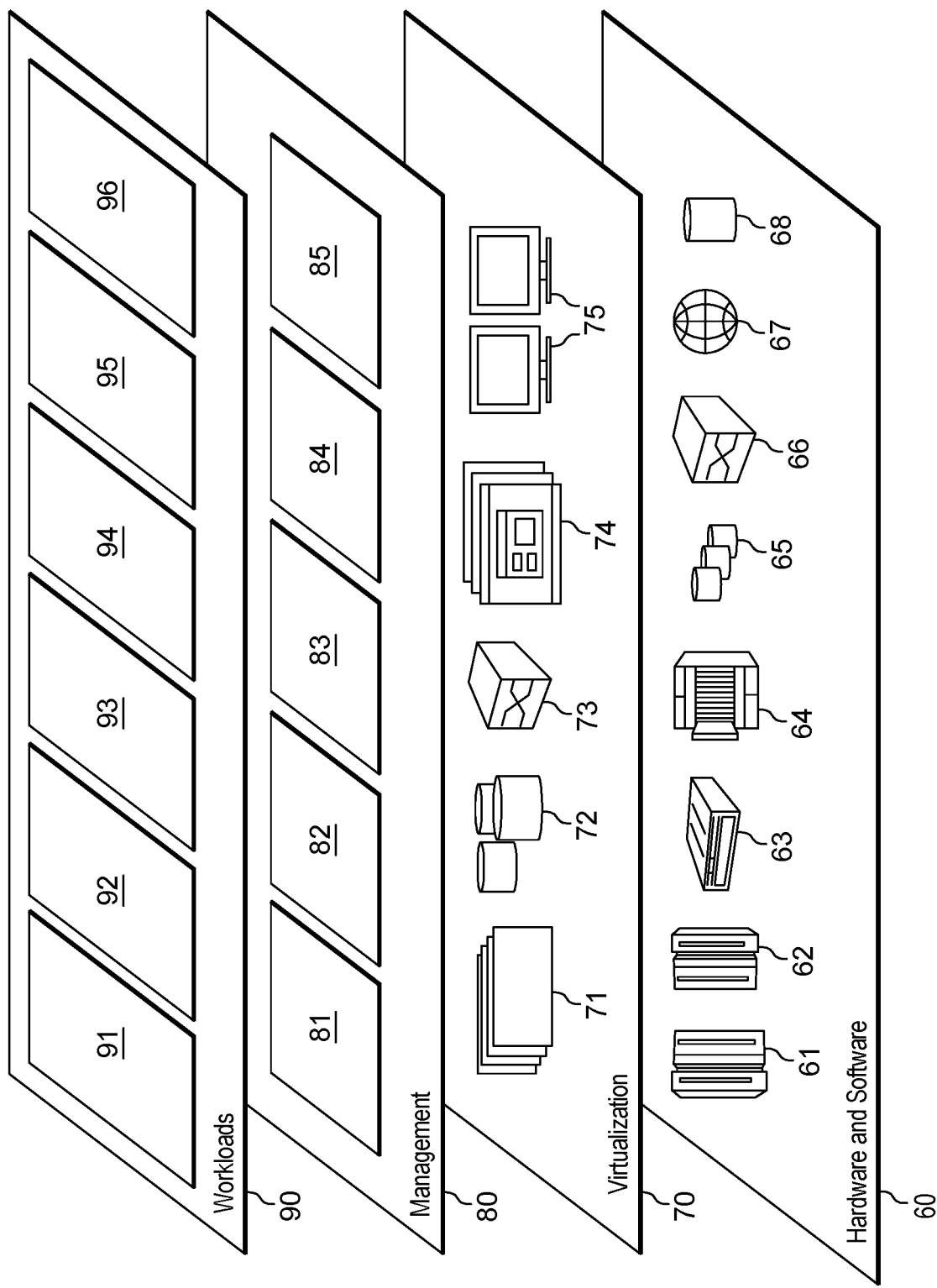
FIG. 13 depicts one example of abstraction model layers, in accordance with one or more aspects of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and shared memory communication processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different register may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
at least one computer-readable storage medium having program instructions embodied therewith, the program instructions being readable by a processing circuit to cause the processing circuit to perform a method comprising:
facilitating shared memory communication between systems of the computing environment capable of communicating over a network using transmission control protocol/Internet protocol (TCP/IP), where a network path between one system and another system of the computing environment passes through one or more routers of the network, and the facilitating comprises:
obtaining performance-related data for shared memory communication of the one system with the other system across the network path using a remote direct memory access (RDMA) protocol; and
based on the performance-related data, dynamically transitioning between the RDMA protocol and the TCP/IP protocol for shared memory communication of the one system with the other system across the network path.

2. The computer program product of claim 1, further comprising:
based on the performance-related data exceeding one or more specified acceptable thresholds, determining not to use the RDMA protocol for shared memory communication of the one system with the other system across the network path, and dynamically adding an identification associated with the other system to an exclude data structure, the exclude data structure identifying one or more systems for which RDMA protocol communication is dynamically excluded from use by the one system; and
using the TCP/IP protocol for the shared memory communication of the one system with the other system across the network path.

3. The computer program product of claim 2, wherein the dynamically adding comprises dynamically adding for a defined time interval the identification associated with the other system to the exclude data structure.

4. The computer program product of claim 3, further comprising dynamically redetermining, based on expiration of the defined time interval, whether to use the RDMA protocol for one or more shared memory communications of the one system with the other system across the network path.

5. The computer program product of claim 3, wherein the defined time interval is user-configurable.

6. The computer program product of claim 1, wherein the systems are peer systems and the one system and the other system are in different j subnets of the network, and the performance-related data comprises a count of one or more routers across which the network path between the one system and the other system passes.

7. The computer program product of claim 1, wherein the obtaining and the dynamically transitioning are by the one system, and the obtaining comprises:
using the RDMA protocol for shared memory communication of the one system with the other system across the network path; and
based on the using, collecting the performance-related data.

8. The computer program product of claim 7, wherein the performance-related data comprises one or more of round-trip time data for shared memory communication by the one system with the other system across the network path using the RDMA protocol, packet loss rate data for shared memory communication of the one system with the other system across the network path using the RDMA protocol, or data indicative of network congestion during shared memory communication of the one system with the other system across the network path using the RDMA protocol.

9. The computer program product of claim 1, wherein the facilitating further comprises establishing a new connection between the one system and the other system across the network path, the establishing comprising determining whether the other system is listed in an exclude data structure identifying one or more systems of the computing environment for which RDMA protocol communication is, at least temporarily, excluded from use by the one system, meaning that the TCP/IP protocol is to be used, at least temporarily, for shared memory communication between the one system and the other system across the new connection.

10. A computer system for facilitating processing within a computing environment, the computer system comprising:
a memory; and
a processing circuit in communication with the memory, wherein the computer system is configured to perform a method, the method comprising:
facilitating shared memory communication between systems of the computing environment capable of communicating over a network using transmission control protocol/Internet protocol (TCP/IP), where a network path between one system and another system of the computing environment passes through one or more routers of the network, and the facilitating comprises:
obtaining performance-related data for shared memory communication of the one system with the other system across the network path using a remote direct memory access (RDMA) protocol; and
based on the performance-related data, dynamically transitioning between the RDMA protocol and the TCP/IP protocol for shared memory communication of the one system with the other system across the network path.

11. The computer system of claim 10, further comprising:
based on the performance-related data exceeding one or more specified acceptable thresholds, determining not to use the RDMA protocol for shared memory communication of the one system with the other system across the network path, and dynamically adding an identification associated with the other system to an exclude data structure, the exclude data structure identifying one or more systems for which RDMA protocol communication is dynamically excluded from use by the one system; and
using the TCP/IP protocol for the shared memory communication of the one system with the other system across the network path.

12. The computer system of claim 11, wherein the dynamically adding comprises dynamically adding for a defined time interval the identification associated with the other system to the exclude data structure.

13. The computer system of claim 12, further comprising dynamically redetermining, based on expiration of the defined time interval, whether to use the RDMA protocol for one or more shared memory communications of the one system with the other system across the network path.

14. The computer system of claim 10, wherein the systems are peer systems and the one system and the other system are in different j subnets of the network, and the performance-related data comprises a count of one or more routers across which the network path between the one system and the other system passes.

15. The computer system of claim 10, wherein the obtaining and the dynamically transitioning are by the one system, and the obtaining comprises:
using the RDMA protocol for shared memory communication of the one system with the other system across the network path; and
based on the using, collecting the performance-related data.

16. The computer system of claim 15, wherein the performance-related data comprises one or more of round-trip time data for shared memory communication by the one system with the other system across the network path using the RDMA protocol, packet loss rate data for with shared memory communication of the one system with the other system across the network path using the RDMA protocol, or data indicative of network congestion during the shared memory communication of the one system with the other system across the network path using the RDMA protocol.

17. A computer-implemented method of facilitating processing within a computing environment, the computer-implemented method comprising:
facilitating shared memory communication between systems of the computing environment capable of communicating over a network using transmission control protocol/Internet protocol (TCP/IP), where a network path between one system and another system of the computing environment passes through one or more routers of the network, and the facilitating comprises:
obtaining performance-related data for shared memory communication of the one system with the other system across the network path using a remote direct memory access (RDMA) protocol; and
based on the performance-related data, dynamically transitioning between the RDMA protocol and the TCP/IP protocol for shared memory communication of the one system with the other system across the network path.

18. The computer-implemented method of claim 17, further comprising:
based on the performance-related data exceeding one or more specified acceptable thresholds, determining not to use the RDMA protocol for shared memory communication of the one system with the other system across the network path, and dynamically adding an identification associated with the other system to an exclude data structure, the exclude data structure identifying one or more systems for which RDMA protocol communication is dynamically excluded from use by the one system; and
using the TCP/IP protocol for the shared memory communication of the one system with the other system across the network path.

19. The computer-implemented method of claim 18, wherein the dynamically adding comprises dynamically adding for a defined time interval the identification associated with the other system to the exclude data structure.

20. The computer-implemented method of claim 19, further comprising dynamically redetermining, based on expiration of the defined time interval, whether to use the RDMA protocol for one or more shared memory communications of the one system with the other system across the network path.

* * * * *